(12) United States Patent
Tovino

(10) Patent No.: US 9,401,952 B1
(45) Date of Patent: Jul. 26, 2016

(54) MANAGING PRESENCE STATE

(71) Applicant: Shoretel, Inc., Sunnyvale, CA (US)

(72) Inventor: Michael S. W. Tovino, Bend, OR (US)

(73) Assignee: Shortel, Inc., San Francisco, CA (US)

( * ) Notice: Subject to any disclaimer, the term of this patent is extended or adjusted under 35 U.S.C. 154(b) by 234 days.

(21) Appl. No.: 13/890,012

(22) Filed: May 8, 2013

Related U.S. Application Data

(60) Provisional application No. 61/778,948, filed on Mar. 13, 2013.

(51) Int. Cl.
*G06F 15/16* (2006.01)
*H04L 29/08* (2006.01)

(52) U.S. Cl.
CPC ..................................... *H04L 67/10* (2013.01)

(58) Field of Classification Search
CPC ... H04L 67/24; H04L 12/5815; H04L 51/043; H04L 65/1063; H04M 3/42365; G06F 11/3055
See application file for complete search history.

(56) References Cited

U.S. PATENT DOCUMENTS

| | | | |
|---|---|---|---|
| 7,336,654 B2 | 2/2008 | Barkley et al. | |
| 7,983,403 B2 | 7/2011 | Sakata et al. | |
| 8,032,112 B2 | 10/2011 | Hines et al. | |
| 8,171,076 B2 | 5/2012 | Matsunaga | |
| 8,363,644 B2 | 1/2013 | Kreitzberg et al. | |
| 2004/0015569 A1* | 1/2004 | Lonnfors et al. | 709/220 |
| 2008/0186929 A1* | 8/2008 | Rice et al. | 370/338 |
| 2008/0208953 A1* | 8/2008 | Tian | 709/201 |
| 2011/0302509 A1* | 12/2011 | Leacock et al. | 715/756 |

* cited by examiner

*Primary Examiner* — Liangche A Wang
*Assistant Examiner* — Ayele Woldemariam
(74) *Attorney, Agent, or Firm* — Tarolli, Sundheim, Covell & Tummino LLP

(57) ABSTRACT

A client application server (CAS) can include a presence layer configured to compute a published presence state for a client of the given CAS that characterizes at least one of an ability and a willingness of the client to communicate with another communication endpoint. The presence layer can also be configured to provide the published presence state for the client to a presence layer of at least another CAS according to a subscription request provided from the another CAS.

9 Claims, 6 Drawing Sheets

MANAGING PRESENCE STATE

CROSS-REFERENCE TO RELATED APPLICATIONS

This application claims the benefit of priority to U.S. Provisional Application No. 61/778,948, filed on Mar. 13, 2013, and entitled OPTIMIZED DISTRIBUTED PRESENCE IN UNIFIED COMMUNICATIONS, the contents of which is incorporated herein by reference in its entirety.

TECHNICAL FIELD

Systems and methods for managing a presence state are disclosed.

BACKGROUND

In computer and telecommunications networks, presence information (e.g., a presence state) can provide a status indicator that conveys an ability and/or a willingness of a potential communication partner, such as a user and/or a user device, to communicate. A client employed by the user can provide presence information (e.g., a presence state) via a network connection to a presence service, which can be stored in an associated personal availability record, and can be made available for distribution to other devices. Such other devices can be referred to as watchers as to convey the client's availability for communication. In some examples, a given device can provide presence information for the given device to the presence service while concurrently being configured as a watcher of another device.

SUMMARY

This disclosure relates to managing presence states, such as in a distributed communications system (e.g., an enterprise communications system).

One example relates to a non-transitory computer readable medium storing machine readable instructions that can include a presence layer of a given client application server (CAS). The presence layer can be configured to compute a published presence state for a client of the given CAS that characterizes at least one of an ability or a willingness of the client to communicate with another communication endpoint (e.g., another party). The presence layer can be configured to provide the published presence state for the client to a presence layer of at least another CAS according to a subscription request provided from the another CAS.

Another example relates to an enterprise system. The enterprise system can include a given CAS configured to calculate a published presence state for a given set of resource objects (ROs) associated with the given CAS, wherein the published presence state for each respective RO in the given set of ROs characterizes at least one of an ability or a willingness of the respective RO to communicate with another party. Another CAS can be configured to communicate with the given CAS via a network. The another CAS can also be configured to provide a CAS subscription request to the given CAS for the published presence state of a given RO of the given set of ROs associated with the given CAS in response to a client subscription request from a client associated with the another CAS.

Yet another example relates to a method that includes determining, at a given CAS, a plurality of different published presence states for a plurality of different ROs associated with the given CAS, wherein the published presence state for each respective RO of the plurality of ROs characterizes at least one of an ability or a willingness of the respective RO to communicate with another party. The method can also include receiving, at the given CAS, a CAS subscription request for the published presence state for a selected RO of the plurality of ROs associated with the given CAS from another CAS. The method can also include providing, from the given CAS, the published presence state for the selected RO to the another CAS via a network.

DETAILED DESCRIPTION

In some examples, a given client application server (CAS) can be employed to determine a presence state for one or more resource objects. By way of example a resource object can include a device (e.g., a desktop phone, a smart phone, a soft phone, an instant messaging service, a calendar service, a location service or the like), a user that employs one or more devices, or a group of users. The presence state for a respective resource object can characterize the ability and/or a willingness to communicate with another resource object as well as information related to the location of the RO, the number of calls to which the RO is connected as explained herein. Such other resource objects can include another resource object, an application, a device or any combination thereof.

In some examples, the ability and/or willingness of a respective resource object to communicate with another resource object, as specified by the presence state, can encapsulate additional related concepts for the respective resource object. For instance, the presence state can describe a level of activity (e.g., how many calls or sessions is the object involved in), a geographical location of the object, the identity of other involved parties, and the like. The given CAS can receive and process a subscription request for the published presence state for the resource object. The subscription request can be provided from another CAS in the enterprise. Subscription requests can also originate in the same CAS in which the resource object operates, such as can be initiated by a client (e.g., software, hardware or a combination thereof). In response to the subscription request from the other CAS, the given CAS can provide the published presence state for the resource object to the other CAS via a network (e.g., a connection within the enterprise). The particular information details encapsulated by the published presence state can vary according to the subscription request. In this manner, bandwidth can be efficiently leveraged and redundant processing of the presence state for the RO can be reduced and/or eliminated.

Figure 1:
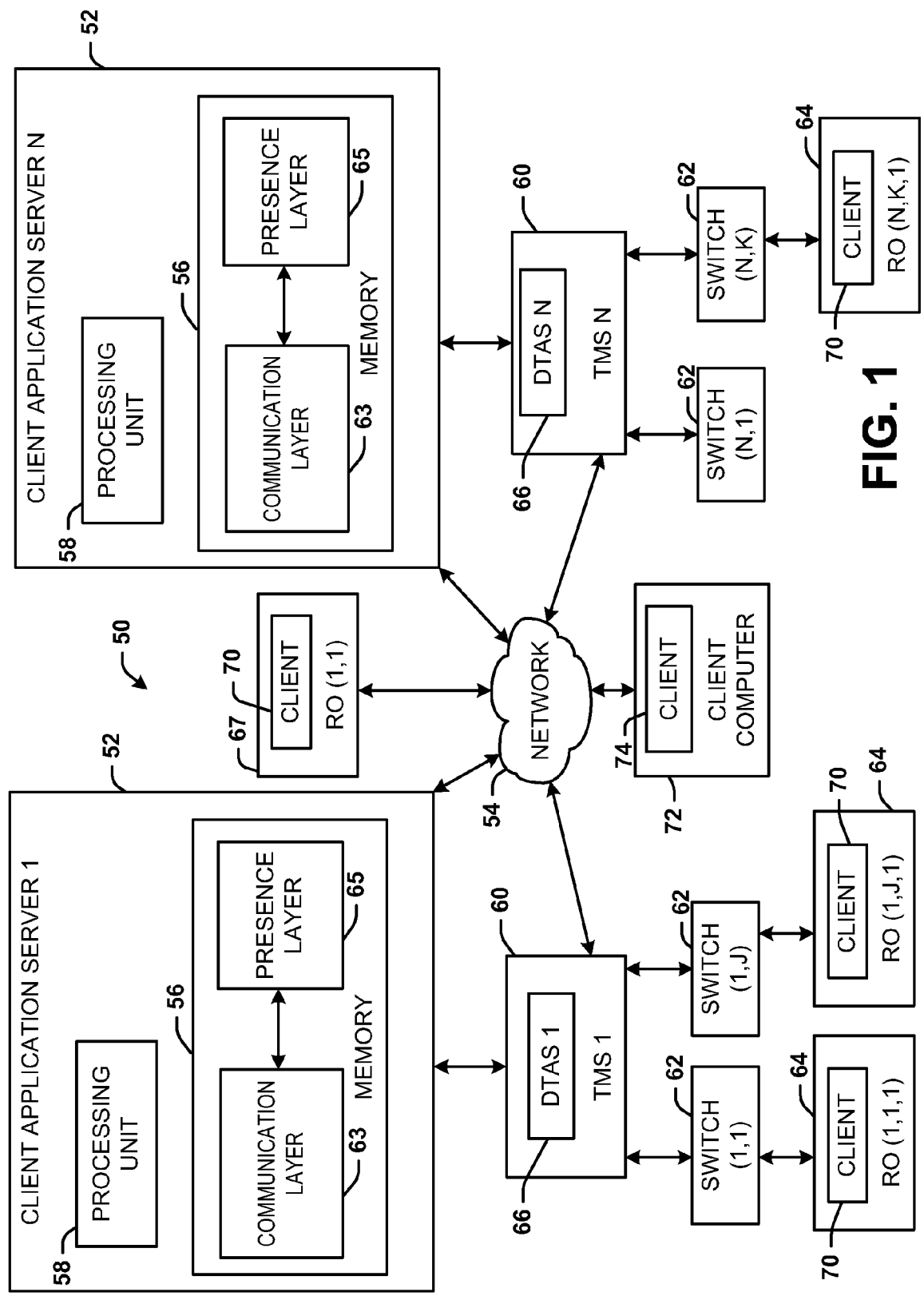
FIG. 1 illustrates an example of a system for managing a presence state.

FIG. 1 illustrates an example of a system 50 for managing a presence state that can be included in presence information. The enterprise system 50 can include N number of CASs 52, where N is an integer greater than or equal to two. Each of the N number of CASs 52 can communicate with each other, such as over a network 54. The network 54 could be a public network (e.g., the Internet) a private network (e.g., a dedicated connection within the enterprise) or combination thereof. In some examples, the system 50 could be implemented as a telecommunication system. For instance, the system 50 can be an enterprise communication system that includes distributed services and equipment that can be physically and/or logically separate within the enterprise. For example, the distributed services can correspond to geographically remote facilities or offices and/or can correspond to different logical groups (e.g., divisions of a business entity or the like). The distributed services and equipment can thus provide for communication to a public network (e.g., the public switched telephone network) as well as intra-enterprise communications.

Each CAS 52 can include a memory 56 for storing machine readable instructions. The memory 56 could be implemented, for example, as a non-transitory computer readable medium, such as volatile memory (e.g., random access memory), non-volatile memory (e.g., a hard disk drive, a solid-state drive, flash memory or the like) or a combination thereof. Each CAS 52 can also include a processing unit 58 that can access the memory 56 and execute the machine readable instructions. The processing unit 58 can include, for example, one or more processor cores. For purposes of simplification of explanation, CAS 1 is referred to as the first CAS 52, and CAS N is referred to as the Nth CAS 52.

The first CAS 52 and the Nth CAS 52 can communicate with a corresponding telephony management system (TMS) 60, which can be referred to as the first TMS 60 and the Nth TMS 60, respectively. Each TMS 60 can also communicate via the network 54. The first TMS 60 can communicate with J number of switches 62, where J is an integer greater than or equal to one. The Nth TMS 60 can communicate with K number of switches 62, where K is an integer greater than or equal to one. For purposes of simplification of explanation, each switch 62 is labeled with a two-dimensional number, which two-dimensional number identifies the corresponding CAS 52 and a number of the switch 62 in a set of switches 62. For instance, as illustrated in FIG. 1, SWITCH (1,1) 62 is associated with the first CAS 52 and is the first switch 62 of the J number of switches 62. Similarly, as illustrated in FIG. 1, SWITCH (N,K) 62 is associated with the Nth CAS 52 and is the Kth switch 62 of K number of switches 62. Moreover, although the switches 62 are illustrated and being described as being coupled to a corresponding TMS 60, in some examples, the switches 62 can be coupled to the network 54 and communicate with the corresponding TMS 60 via the network 54.

Additionally, each switch 62 can be associated with a resource object (RO) 64. Each RO 64 can be representative of a communication endpoint. In one example, a RO 64 could be implemented as a device that can be employed by an end user to facilitate communications (e.g., telephone calls, video and/or video conferencing). In another example, each RO 64 could be implemented to represent a plurality of such devices. In yet another example, each RO could represent a plurality of devices employed by a single user, such that a presence state for the plurality of devices could be "rolled up" to represent a presence state for such user. In still another example, each RO could be implemented as a plurality of devices employed by a plurality of users in a group (e.g., a workgroup), such that the presence state for the plurality of devices can be rolled up to represent a presence state for each of the plurality of users, which in turn could be rolled up to represent a presence state for the group.

Similar to the switches 62, for purposes of simplification of explanation, each RO 64 is labeled with a three-dimensional number, which three-dimensional number identifies the corresponding CAS 52, the corresponding switch 62 and a number of the RO 64 in a set of instances of the RO 64. For instance, as illustrated in FIG. 1, the RO (1,1,1) 64 is associated with the first CAS 52 and SWITCH (1,1) 62 and is the first RO 64 of a set of ROs 64. Additionally, the system 50 can include one or more ROs 67 that can be implemented to facilitate a particular type of communication, such as instant messaging. The RO 67 can be coupled to the network 54. The RO 67 is labeled with a two-dimensional number, which two dimensional number identifies the corresponding CAS 52 and a number of the RO 67 in a set of instances of the RO 67. Thus, in FIG. 1, RO (1,1) 67 is associated with the first CAS 52 and is the first RO 67 of a set of ROs.

Each TMS 60 can be configured to manage connections for the switches 62 and the RO 64. In some examples, each TMS 60 (or some subset thereof) can be implemented, for example, as a hardware appliance (e.g., a device) that can include circuitry, such as a microcontroller, an application-specific integrated circuit (ASIC) chip, or the like. In other examples, each TMS 60 (or some subset thereof) can be implemented as software that can be executing on a host computer (e.g., a server). Each TMS 60 can include a distributed telephony application service (DTAS) 66 to facilitate processing and distribution of signaling information between distributed systems in the enterprise system 50, such as DTAS to DTAS communications over a network. Additionally or alternatively, each TMS 60 each TMS 60 can facilitate voice over internet protocol (VoIP) connections. Each TMS 60 can be configured to process signaling and/or connections between ROs 64, or between a given RO 64 and an external device. The DTASs 66 can communicate via the network 54 (e.g., via a private enterprise network connection, such as a secure connection).

Each switch 62 can be configured to couple a set of the ROs 64 to the corresponding TMS 60. Each TMS 60 can be configured to couple the switches 62 to the corresponding CAS 52. Each switch 62 can include a port that connects the TMS 62 to the public switched telephone network (PSTN). In some examples, each switch 62 (or some subset thereof) can be connected to the PSTN via a plain old telephone service (POTS) connection, a primary rate interface (PRI) connection, an Internet connection or the like. A communication layer 63 included in the memory 56 of each CAS 52 can be configured to determine a communication state for each RO 64 associated with a given CAS 52.

To calculate the communication state, the communication layer 63 can receive signaling information from the TMS 60, such as from one or more of the ROs 64. In some examples, the telephony state for each respective RO 64 can characterize events that occur in relation to the respective RO 64. Such communication state can include, for example, standard telephone signaling data that indicates that a connection with the given RO 64 is being requested, ongoing, or terminated as well as other status information associated with the state of the connection, parties involved and related device information. Processing such signaling messages can be a cumbersome and processor intensive operation. For instance, the communication layer 63 can calculate the communication state based on observation of telephony activity of an observed RO 64. Such signaling messages can have a relatively large variance of sizes and be relatively large (e.g., about 2 kilobytes or more) and can be relatively frequent, such as when a telephony or other communications event occurs. Some such signaling messages contain fields that may not impact a presence state for the observed RO 64. For example, a given signaling message can occupy multiple packets and still not include information that impacts (e.g., changes) the presence state of the observed RO 64. Further, although the signaling messages transferred between the TMS 60 and the communication layer 63 may be large and/or frequent, in some examples, the system 50 may be configured such that signaling messages can be transmitted between processes operating on the same server thereby avoiding transmission of such messages over the network 54. For instance, while in the illustrated example, the communication layer 63 is demonstrated within the CAS 52, in other examples, the communication layer 63 alternatively could be implemented as part of the TMS 60, or vice versa.

A presence layer 65 stored in the memory 56 of each CAS 52 can be configured to determine presence information for each associated RO 64 based on the communication state for each respective RO 64. The presence information can include a presence state calculated for each associated RO 64. Table 1 lists examples of possible presence states for each RO 64. The list of presence states in Table 1 is not meant to be exhaustive. Instead, the list of presence states in Table 1 lists some possible example of presence states that could be calculated by the presence layer 65. The type of presence information further can vary depending on the type and configuration of the RO 64.

TABLE 1

| Uknown | Online | Returned Call |
|---|---|---|
| Offline | Away | Ringing Workgroup |
| Rining Call | Idle | Parked Worgroup Call |
| Parked Call | Busy | Held Workgroup Call |
| Held Call | Be Right Back | Connected Workgroup Call |
| On the Phone | Out to Lunch | Call being Recored |
| Do Not Distrub (DND) | Custom | |
| Non-Standard Call Handling | Connected Call | |

In some examples, the RO 64 can be implemented as a desktop phone, a smart phone (e.g., a wireless phone), or as software executing on a computer (e.g., a softphone). The RO 67 can be implemented, for example, as software executing on a computer, such as an instant messaging client. The presence layer 65 of the first CAS 52 can calculate the presence state for the RO (1,1,1) 64 and the RO (1,J,1) 64. Additionally, the presence layer 65 for the Nth CAS 52 can calculate the presence state for the RO (N,K,1) 64. As noted, in some examples, the same user can be associated with multiple ROs 64, such as can be registered to operate within a respective CAS 52. In such a situation, the presence layer 65 can generate a published presence state for each user associated with the corresponding CAS 52 based on an aggregate of a presence state of each instance of RO 64 assigned to a respective user. As an example, the same user may be assigned a wireless phone, a desktop phone and an instant messaging client. If such a user was unavailable on any one of the desktop phone, the wireless phone and the instant messaging client, the published presence state for the user could be set to "Connected Call", as described in Table 1.

In other examples, multiple ROs 64 can be associated with a group. In such a situation, the presence state for the group can represent an aggregate of presence states of each RO 64 in the group. In still other examples, multiple ROs 64 can be associated with multiple users, which in turn can be associated with a group (e.g., a workgroup). In such a situation, the presence state of an RO can represent an aggregate of presence states for each user in the group.

In some examples, the RO 64 and the RO 67 can include a client 70 that can be configured to subscribe to the corresponding CAS 52 to receive a published presence state for another RO 64. Each client 70 (as well as other equipment 64 and switches 62) can connect and be registered for local operation with a respective CAS in the distributed enterprise system 50. That is, CAS 1, TMS 1 and DTAS 1 and the associated switches 62, equipment 64 and clients 70 collectively form a logical and/or physical division within the larger enterprise system 50.

In a first example (hereinafter, "the first example"), the RO (1,1,1) 64 can include a client 70 that is configured to subscribe to the first CAS 52 to receive a published presence state for the RO (N,K,1) 64. Additionally, a client computer 72 can also be coupled to the network 54. The client computer 72 can have a client 74 executing thereon. The client 74 could be implemented as an RO to include, for example, a softphone (e.g., an application) and/or an instant messaging client. The client 74 of the client computer 72 can also be configured to subscribe to the first CAS 52 for presence information for specific instances of the ROs 64. In a second example (hereinafter, "the second example"), the client 74 of the client computer 72 is configured to subscribe to the first CAS 52 to receive a published presence state for the RO (1,1,1) 64 and the RO (N,K,1) 64. In a third example, (hereinafter, "the third example") the RO (N,K,1) 64 can be configured to subscribe to the Nth CAS 52 to receive the published presence state for the RO (1,J,1) 64. Additionally or alternatively, in some examples, a client 70 or 74 can subscribe to a corresponding CAS 52 to receive a published presence state for a specific RO 64, which can reside in the same or different CAS as the subscribing client.

In the first example, the presence layer 65 of the first CAS 52 can notify the presence layer 65 of the Nth CAS 52 that the RO (1,1,1) 64 has subscribed to receive a presence state for the RO (N,K,1) 64, which notification can be referred to as a CAS subscription request. In response, the presence layer 65 of the Nth CAS 52 can provide a message that includes the presence state of the RO (N,K,1) 64. Such a message can be relatively small since the presence state can be characterized, for example, by an integer. Additionally, the presence layer 65 of the Nth CAS 52 can continuously monitor the presence state of the RO (N,K,1) 64. Upon detecting a change to the presence state of the RO (N,K,1) 64, the presence layer 65 of the Nth CAS 52 can provide an update message to the presence layer 65 of the first CAS 52 that characterizes the nature of the change to the published presence state of the RO (N,K,1) 64. As a further example, CAS-to-CAS communication of presence state information can be limited to a prescribed subset of presence state changes determined relevant to the presence subscription request (e.g., as defined in the subscription data). The presence layer 65 of the first CAS 52 can provide data that characterizes a substantially real time (e.g., from about 0 to about 5 seconds) published presence state of the RO (N,K,1) 64 to the client 70 of the RO (1,1,1) 64. In some examples, based on the capabilities and/or privileges of the RO (1,1,1) 64 as well as a type of the subscription request, a subset of the published presence state provided by the presence layer 65 of the Nth CAS 52 to the presence layer 65 of the first CAS 52 may be provided to the client 70 of the RO (1,1,1) 64.

In the second example, the client 74 of the client computer 72 can provide a subscription request (e.g., a client subscription request) to the first CAS 52 for the published presence state for the RO (1,1,1) 64 as well as the RO (N,K,1) 64. In response, the presence layer 65 of the first CAS 52 can notify the presence layer 65 of the Nth CAS 52 via a subscription request to receive a presence state for the RO (N,K,1) 64. For example, the subscription request can be generated in response to the client 74 of the client computer 72 requesting such presence information. The identity of the user-requestor does not need to be communicated between CASs further reducing the amount of data communicated to manage presence states between CASs. In response, the presence layer 65 of the Nth CAS 52 can provide a message that includes the published presence state of the RO (N,K,1) 64 to the presence layer 65 of the first CAS 52.

Additionally, the presence layer 65 of the Nth CAS 52 can continuously monitor the presence state of the RO (N,K,1) 64. Upon detecting a change to the presence state, the presence layer 65 of the Nth CAS 52 can provide an update message to the presence layer 65 of the first CAS 52 that characterizes the nature of the change to the presence state of the RO (N,K,1) 64. Similarly, the presence layer 65 of the first CAS 52 can continuously monitor the published presence state of the RO (1,1,1) 64. The presence layer 65 of the first CAS 52 can provide data that characterizes a substantially real time (e.g., from 0 to about 5 seconds) published presence state of both the RO (1,1,1) 64 and the RO (N,K,1) 64 to the client 74 of the client computer 72. In some examples, based on the capabilities and/or privileges of the client computer 72 as well as the type of subscription request, a subset of the published presence state determined by the first CAS 52 for the RO (1,1,1) 64 and/or the presence state provided by the published presence layer 65 for the RO (N,K,1) 64 of the Nth CAS 52 to the presence layer 65 of the first CAS 52 may be provided to the client 74 of the client computer 72.

In the third example, the client 70 of the RO (N,K,1) 64 can provide a client subscription request to the presence layer 65 of the Nth CAS 52. In response, the presence layer 65 of the Nth CAS 52 can provide a CAS 52 subscription request to the presence layer 65 of the first CAS 52 (e.g., responsive to a request from an RO within the Nth CAS, such as RO (N,K,1) 64) to receive a published presence state for the RO (1,J,1) 64. In response to the CAS 52 subscription request, the presence layer 65 of the first CAS 52 can provide a message that includes the published presence state of the RO (1,J,1) 64 to the presence layer 65 of the Nth CAS 52. Additionally, the presence layer 65 of the first CAS 52 can continuously monitor the published presence state of the RO (1,J,1) 64. Upon detecting a change to the published presence state, the presence layer 65 of the first CAS 52 can provide an update message to the presence layer 65 of the Nth CAS 52 that characterizes the nature of the change to the published presence state of the RO (1,J,1) 64. The presence layer 65 of the Nth CAS 52 can provide data that characterizes a substantially real time (e.g., within about 5 seconds) published presence state of the RO (1,J,1) 64 to the client 70 of the RO (N,K,1) 64. In some examples, based on the capabilities and/or privileges of the RO (N,K,1) 64 as well as the type of client subscription request, a subset of the presence state determined by the first CAS 52 for the RO (1,J,1) 64 may be provided to the client 70 of the RO (N,K,1) 64. Additionally, in the third example, since there are no subscribers to the presence state of the RO (1,1,1) 64 that are associated with the Nth CAS 52, the presence layer 65 of the first CAS 52 does not need to provide a presence state (or updates) for the RO (1,1,1) 64 to the presence layer 65 of the Nth CAS 52.

In the first, second and third examples, significant bandwidth savings can be achieved. In particular, communication between the presence layers 65 of the first and Nth CASs 52 can be reduced since events that do not change a published presence state of a an RO 64 does not need to be communicated over the network 54. For instance, in the first example, if the RO (N,K,1) 64 were to be connected to a three way telephone call with devices A and B, the presence state of the RO (N,K,1) 64 could be "CONNECTED WORKGROUP CALL". In this scenario, if device B were to be disconnected, but device A was still connected with the RO (N,K,1) 64, in some examples, the presence state of the RO (N,K,1) 64 would remain at "CONNECTED WORKGROUP CALL" even though several telephone events (e.g., a disconnection) has occurred. Thus, in this scenario of the first example, the presence layer 65 of the Nth CAS 52 would not need to send an update message to the presence layer 65 of the first CAS 52 to report a change in the published presence state, thereby saving bandwidth and processing time. Additionally, as noted with respect to the third example, the presence state for a given RO 64 associated with a given one of the first and Nth CASs 52 is only communicated between the presence layers 65 of the first and Nth CAS 52 in cases where there is at least one subscriber associated with the other of the first and Nth CASs 52, thereby reducing bandwidth. Further still, where a message characterizing the published presence state for a given RO 64 is communicated between the presence layers 65 of the first and Nth CAS 52, the message can be relatively small, since data such as signaling information can be omitted.

Additionally, in the first, second and third examples redundant processing of the presence state for each of the ROs 64 can be reduced and/or eliminated. For instance, in the first example, since the presence state for the RO (N,K,1) 64 is determined by the presence layer 65 of the Nth CAS 52, and provided to the presence layer 65 of the first CAS 52, there is no need for the presence layer 65 of the first CAS 52 to repeat the determination of the presence state for the RO (N,K,1) 64.

Figure 2:
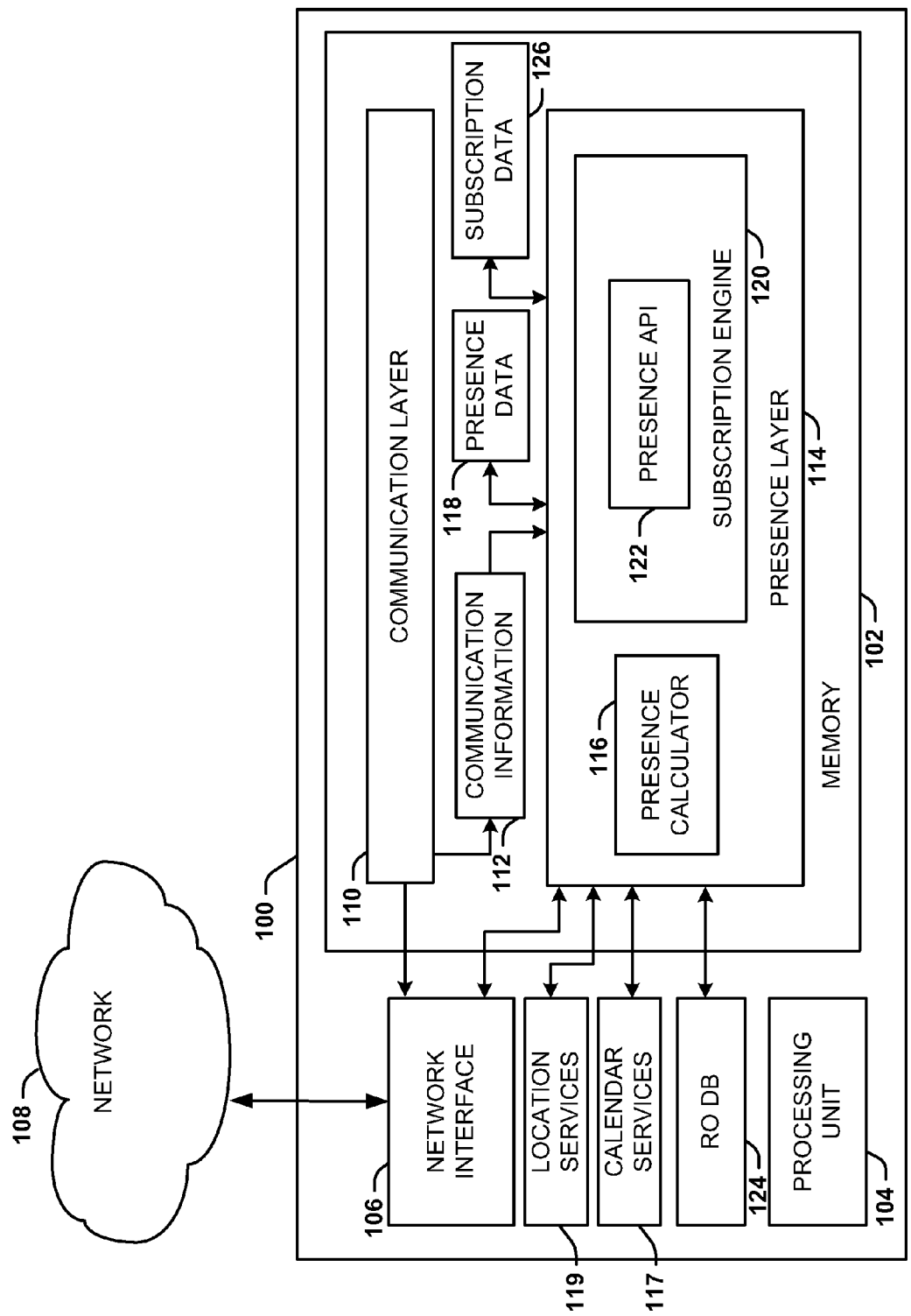
FIG. 2 illustrates an example of a client application server (CAS).

FIG. 2 illustrates an example of a CAS 100 that could be employed, for example to implement a CAS 52 illustrated in FIG. 1. The CAS 100 can include, for example, a memory 102 that can store machine readable instructions. The memory 102 could be implemented, for example, as a non-transitory computer readable medium, such as volatile memory, non-volatile memory or a combination thereof. The CAS 100 can also include a processing unit 104 to access the memory 102 and execute the machine-readable instructions. The processing unit 104 can include, for example, a processor core. The CAS 100 can include a network interface 106 (e.g., a network card) configured to communicate with a network 108, such as a public network (e.g., the Internet) a private network (e.g., a dedicated connection) or combination thereof.

The memory 102 can include a communication layer 110 that can be configured to manage a calling history for each of a plurality of instances of the RO (e.g., RO 64 of FIG. 1) that are associated with the CAS 100. For example, the CAS 100 can communicate with a TMS (e.g., the TMS 60 illustrated in FIG. 1), a switch (e.g., the switch 62 illustrated in FIG. 1) and each RO that is connected to the switch. The communication layer 110 can receive signaling information (e.g., a telephony or other event associated with a communications session) for each associated RO from the TMS via the network 108 and generate a communication state for each associated RO based on the event information. The communication state for a given RO can include, for example, an identity (e.g., a telephone number) of each connection of the given RO, a duration of the connection, and a status of the RO (e.g., off hook, online, ringing or the like). The communication layer 110 can store a communication state for each associated RO in communication information 112.

The memory 102 can also include a presence layer 114 that can receive and process the communication information 112. The presence layer 114 can include a presence calculator 116 that can calculate a presence state for ROs associated with the CAS 100. Table 2 includes an example of pseudo-code that could be employed by presence calculator 116 to determine the presence state for ROs associated with the CAS 100.

TABLE 2

```
EnumPresence CLineData::GetTelPresence(int &nCallsCount) const
{
    CTapiLock lock(__LINE__);
    nCallsCount = 0;
    bool bOffering = false;
    bool bHeld = false;
    bool bParked = false;
    bool bParkReturn = false;
    bool bRecording = false;
    foreach (Call c in calls) {
        switch (c->GetCallState()) {
            case csConnectedQueuedOnWG:
            case csOffering:
            case csAccepted:
                nCallsCount++;
                bOffering = true;
                if (c->IsParkReturn()) {
                    bParkReturn = true;
                }
                break;
            case csOnHold:
            case csOnHoldSetupSilentMon:
            case csOnHoldPendXfer:
            case csOnHoldPendConf:
                nCallsCount++;
                bHeld = true;
                break;
            case csParked:
                nCallsCount++;
                bParked = true;
                break;
            case csConnected:
            case csConnectedFarHold:
            case csConnectedMuted:
            case csConnectedWhisperPage:
                nCallsCount++;
                bRecording = c->IsCallRecordable() && !c-
>GetCallRecordedByCAS().empty();
                break;
            case csIdle:
            case csDisconnected:
            case csDisconnectedInvalidAddress:
            case csConferenced:
            case csUnknown:
                // no incremenet calls count
                break;
            default:
                nCallsCount++;
                break;
        }
    }
    if (bOffering) {
        if (bParkReturn) {
            return presReturnedCall;
        }
        return presRingingCall;
    }
    if (bParked) {
        return presParkedCall;
    }
    if (bHeld) {
        return presHeldCall;
    }
    if (nCallsCount > 0) {
        if (bRecording) {
            return presRecordingCall;
        }
        return presConnectedCall;
    }
```

TABLE 2-continued

```
    if (IsDND()) {
        return presDND;
    }
    switch (IsNonStandardCallHandling())
    {
        return presNonStdCHM;
    }
    return IsOnline() ? presOnline : presUnknown;
}
```

Table 2 describes instructions corresponding to a method for calculating the presence state of a given RO. As an example, in Table 2, if the given RO has exactly one call and the given RO is actively communicating with another RO, the given RO would have '1' "Call c in calls" and the call's state would be "csConnected". If none of "bOffering", "bHeld", or "bParked" flags are set in Table 2, the presence state for the given RO would be "presConnectedCall", in Table 2 which could correspond to "Connected Call" in Table 1. Subsequently, if the given RO were to put the call on hold and activate a second call (e.g., set the "csConnected" flag in Table 2) and a third call is ringing (e.g., set the "bOffering" flag in Table 2), the resultant presence state for the given RO would be "presRingingCall" in Table 2, which could correspond to "Ringing Call" in Table 1.

The published presence state for each RO associated with the CAS 100 can be updated by the presence calculator 116 in real time, such that upon detecting a change in the communication information (e.g., including telephony signaling data) 112 that would result in the presence calculator 116 calculating a different presence state for the given RO would cause a corresponding change in the published presence state. The published presence state or each RO associated with the CAS 100 can be stored by the presence calculator 116 in presence data 118.

Additionally or alternatively, the presence state of a given RO can be a presence of a user that is assigned multiple devices. In one example, the user (e.g., the given RO) can have a desktop phone and a smart phone (e.g., a wireless phone). In another example, the user can have multiple desktop phones in the given user's working space. In yet another example, the user can have a desktop phone and an instant messaging client. The presence state for each device associated with the user can be implemented, for example, as a presence state included in Table 1 described with respect to FIG. 1. Stated differently, the presence state for the given RO (e.g., a user) can represent an aggregate (e.g., summary) of presence states of the multiple devices associated with the user. In this situation, the presence calculator 116 can examine communication information 112 of each device associated with the user (e.g., the given RO) to determine a published presence state that can characterize an aggregate of the communication states associated with each of the devices associated with the user. For instance, if each device associated with the user is "idle", the published presence state for the given RO can also be set to idle. Additionally, if one or more devices associated with the user indicates that the user is unavailable, (e.g., "Ringing Call", "On the Phone", "Connected Call" or the like) the published presence state for the given RO can be set to such a presence state.

In other examples, the presence state of a given RO can be a presence state of multiple users that share a single device (e.g., a shared resource). In one example, the given RO can include a conference phone that is shared by multiple users. In such a situation the presence state for the given RO can be the presence state for the plurality of users.

In yet other examples, the presence state of a given RO can be an aggregate presence state of multiple users, wherein each user can be assigned multiple devices (or a single device), such as in a group. In such a situation the presence state for the given RO can be an aggregate of the presence state for the plurality of users in the group.

Additionally, in some examples, the presence calculator 116 can communicate with calendar services (e.g., scheduling) 117 and/or location services 119 (e.g., positing) to facilitate the determination of the presence state for each RO. For example, each RO (or some subset thereof) associated with the CAS 100 can have a calendar that could provide scheduling information to the calendar services 117 that can indicate a time where a respective RO is unavailable (e.g., in a meeting). In such a situation, the presence calculator 116 can include such scheduling information in the calculation of the presence state for each RO associated with the CAS 100. Similarly, the location services 119 can provide location information that can characterize a physical location of each RO (or some subset thereof) associated with the CAS 100. The presence calculator 116 can include such position information in the calculation of the presence state for each RO associated with the CAS 100.

The presence layer 114 can include a subscription engine 120 that can include a presence application programming interface (API) 122 to receive a client subscription request from a client operating on a device (e.g., a client computer or RO). In some examples, the presence API 122 can include a client presence API that can receive the client subscription request. The client subscription request can specify a request for a presence state of a given user associated with a given RO. The client subscription request can include, for example, an identifier (e.g., an extension and/or an address) of the given RO and/or an identifier for a given user (e.g., a name or username).

The client subscription request can be analyzed by the subscription engine 120. The subscription engine 120 can access an RO database (RO DB) 124 to identify the given RO. The RO DB 124 can include data characterizing an RO associated with the CAS 100, as well as data characterizing ROs associated with different CASs. The data characterizing a specific RO can include data that identifies, for example, a user assigned to the specific RO, capabilities of the specific RO as well as security privileges associated with the user assigned to the RO. For instance, as noted, the specific RO can have data stored in the RO DB 124, which data can indicate if the specific RO is implemented as a smart phone, a desktop phone or a soft phone (e.g., software executing on a computer) an instant messaging client or the like. If the given RO is identified, the user associated with the given RO can also be identified, which user can be referred to as the given user. Additionally, the data can characterize privileges of the specific RO and such privileges can be based on a role of a user associated with the specific RO (e.g., as defined within the enterprise system).

The client subscription request from the client of the device can be analyzed by the subscription engine 120 to determine a CAS associated with the given RO. In some examples, the client subscription request can directly identify the given RO (e.g., by extension number or username associated with the given RO). In other examples, the client subscription request can be a search request that includes only part of the information needed to specifically identify the given RO (e.g., a partial name, a partial extension number or the like). In such example, the subscription engine 120 can search the RO DB 124 for the RO (or ROs) that is a closest match (or matches) and designate the RO that is the closest match as the given RO and/or the given user. The subscription engine 120 can examine the data associated with the given RO and/or the given user to determine the associated CAS.

In some examples, the given RO may be associated with the CAS 100. In such a situation, the subscription engine 120 can retrieve the published presence state associated with the given RO from the presence data 118. In other examples, the given RO may be associated with another CAS that communicates with the CAS 100 by the network 108. In such a situation, the subscription engine 120 can provide a CAS subscription request to the other CAS via the network 108. The amount of detail requested in the CAS subscription request can vary, for example, based on the type of client request as explained herein. In response, the subscription engine 120 can receive a published presence state that characterizes a substantially real-time presence state of the given user. The subscription engine 120 can store the published presence state in the presence data 118.

The subscription engine 120 can analyze the type of the client subscription request, the capabilities and the privileges associated with the client of the device and provide a message to the client of the device in response to the client subscription request. For example, the message can include data that characterizes the published presence state of the given RO corresponding to such capabilities, privileges and the type provided by the client subscription request. The type of client subscription request can specify, for example, one of any number of levels of detail. The data corresponding to the published presence state can depend on a given subscription request or it can be determined based on evaluation of multiple subscription requests for presence state information of a given RO. In some examples, the level of presence state information for a given RO can be, for example, commensurate with the highest level (e.g., most granular level of detail) of presence state indicated by a subscription request for the given RO. As mentioned, there can be any number of subscription requests for presence information for each RO, each of which can specify a different level of presence information.

In one example, the client subscription request can be a basic presence, a detailed presence or an enhanced detailed presence. In an example where capabilities and/or privileges of the client or device, or the client subscription request indicates the client is to be provided a basic presence, the subscription engine 120 can analyze the published presence state of the given RO and provide a corresponding presence state for the client. For instance, if the client of the device is to receive a basic presence, and the published presence state of the given RO is "Connected Call", "Ringing Call" or "Held Call", the subscription engine 120 can simply provide a presence state of "On the Phone" to the client of the device, and if the published presence state of the given RO is "Idle" the subscription engine 120 can provide a presence state of "Idle" to the client of the device. In other examples, such as where the privileges, capabilities and the type of the client subscription request indicates that the client of the device is to receive a detailed presence, the subscription engine 120 can provide the actual published presence state of the given RO such as information that can, for example, identify whether the given RO is "Idle", "Offering a Call", "Connected Call", "Connected Workgroup Call" or the like. In yet other examples, such as where the privileges, capabilities and the type of the client subscription request indicates that the client of the device is to receive an enhanced detailed presence, the subscription engine 120 can provide the detailed presence state of the given RO as well as information characterizing a number of calls that the given RO is connected to, an identity (e.g., an extension number) to which unanswered calls are forwarded or the like.

The corresponding presence state for the client of the device can be provided to the client of the device from the presence API 122 via the network 108. Data characterizing details of the subscription for the given RO can be stored in subscription data 126. The subscription data 126 can include, for example an identifier of the CAS associated with the given RO, the type of subscription request or the like.

In another example, if the CAS 100 and the another CAS already have an existing (e.g., open) communication connection, the presence data for the given RO can be provided via the existing communication connection. For instance, if the CAS 100 receives a first client subscription request for an "enhanced detailed presence" for the given RO from a client from a first device, the client subscription request can be processed in the manner described to establish an open connection. In this situation, if a second client subscription request for a "detailed presence" or a "basic presence" for the given RO from a client from a second device is received at the CAS 100, the subscription engine 120 can determine that the presence state for the given RO is already being provided to the CAS 100. In this situation, the subscription engine 120 can modify the presence state to accommodate the type of subscription request provided by the client of the second device and provide the modified presence state to the client of the second device without opening a second communication session.

In yet another situation, if the CAS 100 receives a first client subscription request for a "basic presence" for the given RO from a client from a first device, the client subscription request can be processed in the manner described to establish an open connection. In this situation, if a second client subscription request for a "detailed presence" or a "enhanced detailed presence" for the given RO from a client from a second device, is received at the CAS 100, the subscription engine 120 can determine that the presence state for the given RO is already being provided to the CAS 100. In this situation, the subscription engine 120 can modify the CAS subscription request to the other CAS to accommodate the type of subscription request provided by the client of the second device. Moreover, the CAS 100 can modify the presence state of the given RO to be commensurate with type of subscription request provided by the client of the first device (e.g., a basic presence) and provide the presence state to the client of the second device corresponding to the type of subscription request provided from the client of the second device, such that the subscription requests for the first and second devices can be serviced with a single communication session. Accordingly, where multiple client subscription requests are provided from multiple requesting clients for a presence state the same RO, the subscription engine 120 can provide a (single) CAS subscription request to the appropriate CAS for a highest level of detail (e.g., most detailed) requested by any of requesting clients.

Additionally, the presence API 122 can be programmed to receive a CAS subscription request from another CAS via the network 108 for a presence state for a RO associated with the CAS 100. In some examples, the presence API 122 can include a CAS presence API that can receive the CAS subscription request. The CAS subscription request can, for example, include an identifier of a given RO that is associated with the CAS 100. In some examples, the CAS subscription request can also include an indication of a level of detail requested for the presence state (e.g., basic presence, detailed presence or enhanced detailed presence). In response to the CAS subscription request, the subscription engine 120 can retrieve the published presence state for the given RO from the presence data 118. Additionally, the subscription engine 120 can set the published presence state to a level of detail corresponding to the CAS subscription request. The presence API 122 can provide the published presence state to the other CAS via the network 108. Moreover, in the event that the subscription engine 120 detects a change to the presence state of the given RO, the subscription engine 120 can employ the presence API 122 to provide an update message to the other CAS via the network 108 that reflects the change to the presence state of the given RO.

In another example, a client of a device that is associated with the CAS 100 can have an ongoing subscription for a presence state of a given RO that is associated with the another CAS, the details of which can be stored in the subscription data 126. In this situation, if the device is a mobile device (e.g., a smartphone), the device may cease association with the CAS 100 and initiate association with a different CAS, such as the another CAS or a third CAS, which can be referred to as a new CAS. In such a situation, in some examples, the subscription engine 120 can terminate the subscription of the client of the device, such that the client of the device can provide a client subscription request to the new CAS that can be processed in the manner described herein. In other examples, the subscription engine 120 can provide the subscription data 126 to the new CAS, and a subscription engine of the new CAS can modify the subscription data 126 to support the change from the CAS 100 to the new CAS.

By employing the CAS 100, bandwidth usage of the network 108 between the CAS 100 and the other CAS can be reduced. For example, the CAS 100 and/or a corresponding DTAS does not need to transmit signaling and/or event information to the other CAS that does not result in a change to a published presence state. Further, the presence layer 114 of the CAS 100 only needs to provide the published presence state in response to subscription requests. That is, the published presence state of ROs which no subscription request has been received need not be provided from the CAS 100 to another CAS. Moreover, redundant calculations of the published presence state for various RO can be reduced and/or eliminated.

Figure 3:
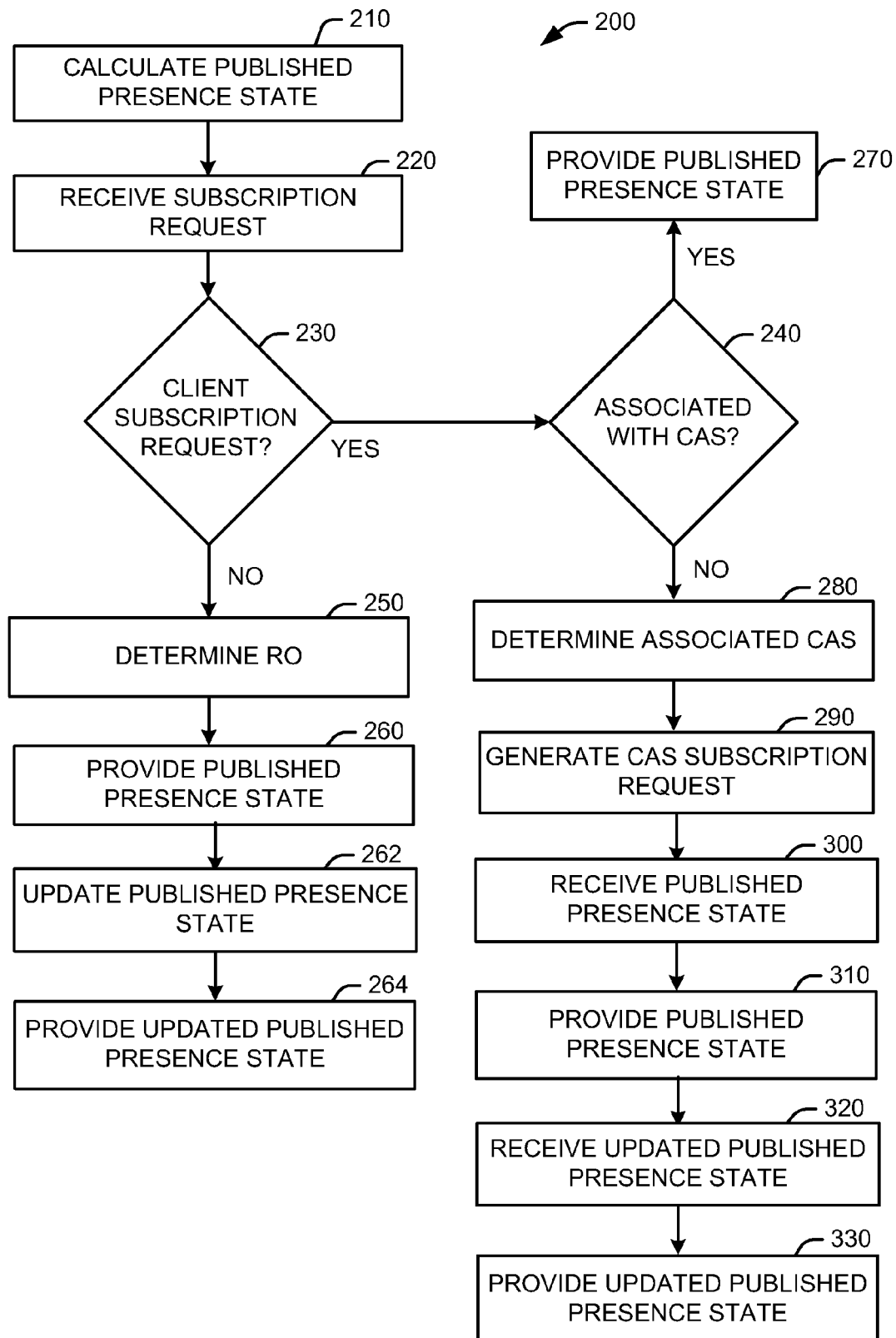
FIG. 3 illustrates a flowchart of an example method for managing a presence state.
Figure 4:
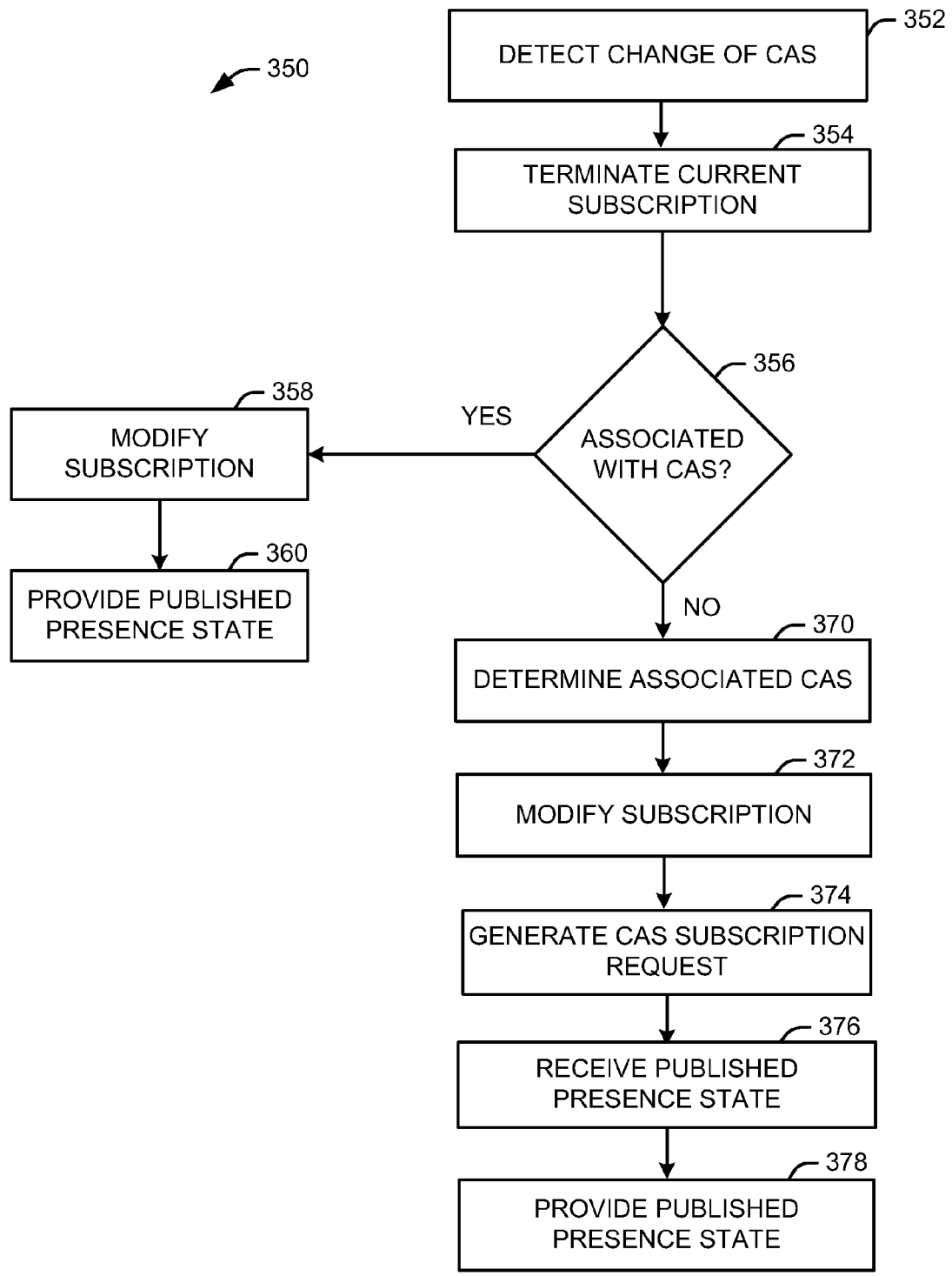
FIG. 4 illustrates another flowchart of an example method of managing a client subscription.
Figure 7:
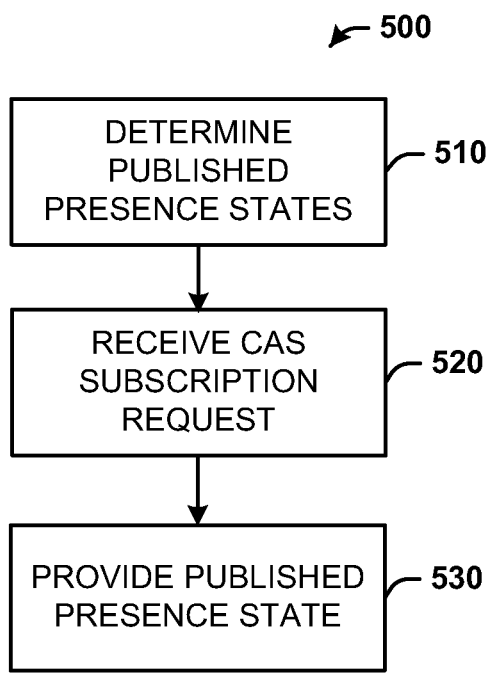
FIG. 7 illustrates another flowchart of an example method for managing a presence state.

In view of the foregoing structural and functional features described above, example methods will be better appreciated with reference to FIGS. 3, 4 and 7. While, for purposes of simplicity of explanation, the example methods of FIGS. 3, 4 and 7 are shown and described as executing serially, it is to be understood and appreciated that the presence examples are not limited by the illustrated order, as some actions could in other examples occur in different orders and/or concurrently from that shown and described herein. Moreover, it is not necessary that all described actions be performed to implement a method. The example methods of FIGS. 3, 4 and 7 can be implemented as instructions stored in a non-transitory machine-readable medium. The instructions can be accessed by a processing resource and executed to perform the methods disclosed herein.

FIG. 3 illustrates an example of a method 200 for managing presence states. The method 200 could be implemented, for example, by the distributed system 50 illustrated in FIG. 1 and/or the CAS 100 illustrated in FIG. 2. At 210, a presence layer (e.g., the presence layer 114) of a CAS (e.g., the first CAS 52 illustrated in FIG. 1 and/or the CAS 100 illustrated in FIG. 2) can include a presence calculator (e.g., the presence calculator 116 illustrated in FIG. 2) that can calculate a published presence state for ROs that are associated with the CAS. The published presence state for each RO associated with the CAS can be calculated by employing a communication state for each RO associated with each RO associated with the CAS.

At 220, a subscription request for a presence state for a given RO of the ROs associated with the CAS can be received at a presence API (e.g., the presence API 122 of FIG. 2) of the presence layer. The subscription request can include an identifier of the given RO and/or an identity (e.g., an extension number) of the RO associated with the given RO. At 230, a subscription engine of the presence layer can make a determination as to whether the subscription request is a client subscription request that originated from a client of a device (e.g., a computer or RO). If the determination at 230 is positive (e.g., YES), the method 200 can proceed to 240. If the determination is negative (e.g., NO), the method 200 can proceed to 250.

At 250, since the determination at 230 is negative, the subscription engine can determine that the CAS is a CAS subscription request that originated from another CAS. Moreover, at 250, the subscription engine can determine a given RO associated with the subscription request. In some examples, the given RO can be explicitly identified in the subscription request. In other examples, the given RO can be identified by the context of the subscription request (e.g., a partial name, a partial extension number or the like). At 260, a published state of the given RO can be provided to the other CAS via the presence API. In some examples, the published presence state of the given RO can be based on the type of subscription request provided by the CAS (e.g., basic presence, detailed presence or enhanced detailed presence, which can contain additional data beyond the presence state).

At 262, the published presence state of the given RO can be updated by the presence calculator in response to the presence calculator detecting a change in the presence state of the given RO. At 264, the presence API can provide the updated published presence state to the other CAS. In this manner, a substantially real-time status of the published presence state for the given RO can be maintained.

At 240, a determination by the subscription engine can be made as to whether a given RO identified in the subscription request is associated with the CAS. If the determination at 240 is positive (e.g., YES), the method 200 can proceed to 270. If the determination at 240 is negative (e.g., NO), the method 200 can proceed to 280. At 270, a published presence state of the given RO can be provided by the presence API to the client of the device from which the subscription request originated. The published presence state provided to the client of the device can be commensurate with the type of subscription request (e.g., basic presence, detailed presence or enhanced detailed presence) as well as the capabilities and privileges of the client of the device from which the client subscription request is provided.

At 280, an identity of the CAS (e.g., the other CAS) that is associated with the given RO can be determined by the subscription engine. At 290, a CAS subscription request for the given RO can be generated by the presence API and provided to the other CAS. At 300, the presence API can receive a published presence state that can characterize a substantially real-time presence state for the given RO, which can be updated by the other CAS in response to detecting a change in the presence state of the given RO. At 310, the published presence state for the given RO can be provided to the client of the device via the presence API. The published presence state provided to the client of the device can be commensurate with the type of subscription request (e.g., basic presence, detailed presence or enhanced detailed presence) as well as the capabilities and privileges of the client of the device from which the client subscription request is provided. In this manner, a client subscription for the client of the device can be established.

At 320, the presence API can receive an updated published presence state from the other CAS that can characterize a change in the presence state of the given RO. At 310, the updated published presence state for the given RO can be provided to the client of the device via the presence API. In this manner, the substantially real-time status of the published presence state for the given RO can be maintained.

FIG. 4 illustrates an example of a method 350 for managing a client subscription. The method 350 could be implemented, for example, by the distributed system 50 illustrated in FIG. 1 and/or the CAS 100 illustrated in FIG. 2. In the method 350, it is presumed that a client subscription for a given RO has been established for client of a device, such as in a manner described with respect to the method 200 illustrated in FIG. 3. The details of the client subscription can be stored in subscription data (e.g., the subscription data 126 of FIG. 2). In this example, the client of the device is associated with a given CAS (e.g., the first CAS 52 illustrated in FIG. 1 and/or the CAS 100 illustrated in FIG. 2) and the given RO is associated with another CAS (e.g., the Nth CAS 52 illustrated in FIG. 1. At 352, a subscription engine (e.g., the subscription engine 120) of the given CAS can receive message from the another CAS that indicates that the given RO is no longer associated with the another CAS, such that the subscription engine detects a change in CAS association for the given RO. For instance, the given RO could be a smartphone that changes associated CASs from the other CAS to a new CAS or a user could login to a desk phone that resides in a different CAS. This scenario might result when an employee travels from his home office in New York to another remote office in San Francisco that is part of the same enterprise network. At 354, the presence layer of the given CAS can terminate the current established subscription for the client of the device.

At 356, a determination by the subscription engine can be made as to whether the new CAS is the given CAS. If the determination at 356 is positive (e.g., YES), the method 200 can proceed to 358. If the determination at 356 is negative (e.g., NO), the method 200 can proceed to 370. At 358, the subscription data can be modified by the subscription engine to identify the given CAS. At 360, a published presence state of the given RO can be provided by a presence API of the subscription engine to the client of the device. The published presence state provided to the client of the device can be commensurate with the type of subscription request (e.g., basic presence, detailed presence or enhanced detailed presence) as well as the capabilities and privileges of the client of the device from which the client subscription request is provided.

At 370, an identity of the CAS (e.g., the new CAS) that is associated with the given RO can be determined by the subscription engine. At 372, the subscription engine can modify the subscription data to reflect the change to the CAS associated with the given RO. At 374, a CAS subscription request for the given RO can be generated by the presence API and provided to the new CAS. At 376, the presence API can receive a published presence state that can characterize a substantially real-time presence state for the given RO, which can be updated by the new CAS in response to detecting a change in the presence state of the given RO. At 378, the published presence state for the given RO can be provided to the client of the device via the presence API. The published presence state provided to the client of the device can be commensurate with the type of subscription request (e.g., basic presence, detailed presence or enhanced detailed presence) as well as the capabilities and privileges of the client of the device from which the client subscription request is provided.

Figure 5:
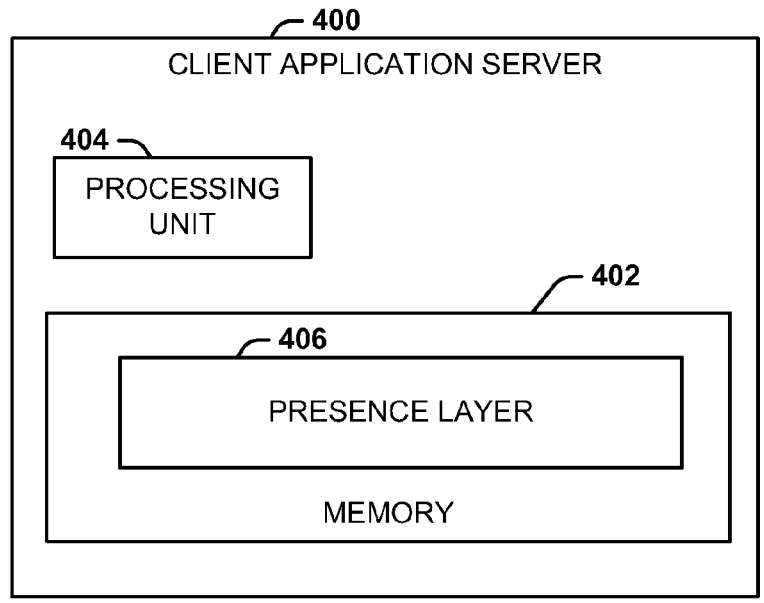
FIG. 5 illustrates another example of a CAS.

FIG. 5 illustrates another example of CAS 400 that could be employed as the CAS 52 illustrated in FIG. 1 and/or the CAS 100 illustrated in FIG. 2. The CAS 400 can include a memory 402 (e.g., a non-transitory computer readable medium) for storing machine readable instructions. The CAS 400 can also include a processing unit 404 to access the memory 402 and execute the machine readable instructions. The machine readable instructions 402 can include a presence layer 406 configured to compute a published presence state for a client of the CAS 52 that characterizes an ability and/or a willingness of the client to communicate with another communication endpoint (e.g., another party). The presence layer 406 can also be configured to provide the published presence state for the client to a presence layer of at least another CAS according to a subscription request provided from the another CAS.

Figure 6:
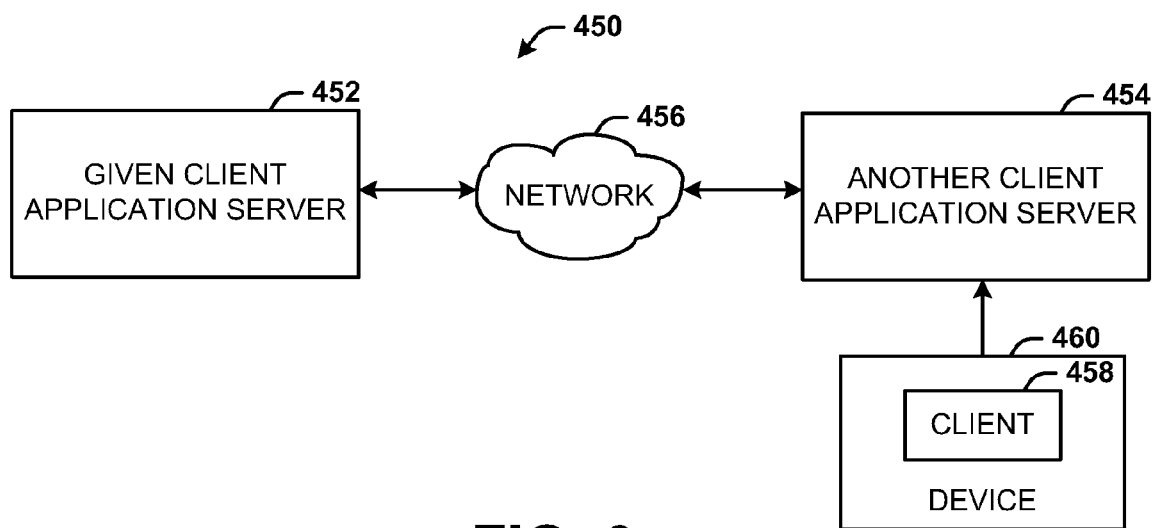
FIG. 6 illustrates another example of a system for managing a presence state.

FIG. 6 illustrates another example of a system for managing presence states. The system 450 could be employed, for example, to implement the system 50 illustrated in FIG. 1. The system can include a given CAS 452 configured to calculate a published presence state for a given set of ROs associated with the given CAS 452. The published presence state for each respective RO in the given set of ROs can characterize an ability and/or willingness of the respective RO to communicate with another communication device. The system can also include another CAS 454 configured to communicate with the given CAS 452 via a network 456. The other CAS can also be configured to provide a CAS subscription request to the given CAS 452 for the presence state of a given RO of the given set of ROs associated with the given CAS 452 in response to a client subscription request from a client 458 of a device 460.

FIG. 7 illustrates a flowchart of an example method 500 for managing presence states. The method could be implemented, for example, by a given CAS, such as the CAS 52 illustrated in FIG. 1 and/or the CAS 100 illustrated in FIG. 2. At 510, the given CAS can determine a plurality of different published presence states for a plurality of different ROs associated with the given CAS. The published presence state for each respective RO of the plurality of ROs can characterize an ability and/or a willingness of the respective RO to communicate with another communication endpoint. At 520, the given CAS can receive a CAS subscription request for the published presence state for a selected RO of the plurality of ROs associated with the given CAS from another CAS. At 530, the given CAS can provide the published presence state for the selected RO to the another CAS via a network.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:
1. An enterprise system comprising:
a given client application server (CAS) device comprising a processor to
determine a published presence state for each resource object (RO) of a given set of resource objects (ROs) associated with the given CAS device, wherein the published presence state for each respective RO in the given set of ROs characterizes at least one of an ability or a willingness of the respective RO to communicate with another communication endpoint; and
another CAS device comprising another processor to:
communicate with the given CAS device via a network; and
provide a CAS subscription request to the given CAS device for the published presence state of a subset of the given set of ROs associated with the given CAS device in response to a client subscription request from a client associated with the another CAS device, wherein the CAS subscription request is associated with a type of data to be provided,
wherein the given CAS device provides the published presence states for the subset of the given set of ROs to the another CAS device according to the type of data specified in the CAS subscription request, and
wherein the another CAS device is further configured to provide data that characterizes at least a portion of the published presence states for the subset of the given set of ROs to the client associated with another RO of the another CAS device according to capabilities and privileges of the client,
wherein the another CAS device is further configured to calculate a published presence state for another set of ROs associated with the another CAS device, wherein the published presence state for each respective RO in the another set of ROs characterizes an ability of the respective RO to communicate with the another communication endpoint; and
wherein the given CAS device is further configured to provide a corresponding CAS subscription request to the another CAS device for another RO of the another set of ROs associated with the another CAS device in response to a client subscription request from a client associated with the given CAS device.

2. The system of claim 1, wherein the given RO of the given set of ROs associated with the given CAS device corresponds to a given user associated with a plurality of different devices and the published presence state for the given RO characterizes an aggregate of a presence state associated with each of the different devices associated with the given user.

3. The system of claim 1, wherein the given CAS device is further configured to provide an updated published presence state to the another CAS device in response to calculating a change in the published presence state for at least one RO of the subset of the given set of ROs.

4. The system of claim 1, wherein the given CAS device is further configured not to provide an update to the published presence state in response to determining that a change in communication information for at least one RO of the subset of the given set of ROs does not result in a change to the published presence state for the at least one RO.

5. A method comprising:
determining, at a given client application server (CAS), a plurality of different published presence states for each of a plurality of different resource objects (ROs) associated with the given CAS, wherein the published presence state for each respective RO of the plurality of ROs characterizes an ability of the respective RO to communicate with another communication endpoint;

receiving, at the given CAS, a CAS subscription request for a type of the published presence state for a subset of the plurality of ROs associated with the given CAS from another CAS; and providing, from the given CAS, a message encapsulating the type of published presence states for the subset of the plurality of ROs to the another CAS according to the subscription request via a network, wherein the another CAS device provides data that characterizes at least a portion of the published presence states for the subset of the given set of ROs to the client associated with another RO of the another CAS device according to capabilities and privileges the client, wherein the another CAS device is further configured to calculate a published presence state for another set of ROs associated with the another CAS device, wherein the published presence state for each respective RO in the another set of ROs characterizes an ability of the respective RO to communicate with the another communication endpoint; and wherein the given CAS device is further configured to provide a corresponding CAS subscription request to the another CAS device for another RO of the another set of ROs associated with the another CAS device in response to a client subscription request from a client associated with the given CAS device.

6. The method of claim 5, further comprising not providing the published presence state to the another CAS for a given RO of the plurality of ROs associated with the given CAS that does not fall within the subset of the plurality of ROs, wherein the given RO and the selected RO are different ROs.

7. The method of claim 5, further comprising:

receiving, at the given CAS, a client subscription request from a client for a published presence state of another RO that is not associated with the given CAS;

providing, at the given CAS, a CAS subscription request to the another CAS for the published presence state of the another RO in response to the client subscription request;

receiving, from the another CAS, the published presence state for the another RO; and establishing, at the given CAS, a client subscription for the client.

8. The method of claim 7, further comprising:

terminating, at the given CAS, the client subscription in response to determining that the another RO is associated with a selected CAS, wherein the another CAS and the selected CAS are different CASs; and providing, at the given CAS, a CAS subscription request to the selected CAS for the published presence state of the another RO in response to the terminating.

9. The method of claim 5, further comprising:

updating, at the given CAS, the published presence state for at least one RO of the subset of the plurality of ROs associated with the given CAS; and providing, from the given CAS, an update to the published presence state for the at least one RO to the another CAS via the network.

* * * * *